United States Patent
Meyer

[11] 3,977,704
[45] Aug. 31, 1976

[54] PIPE COUPLER

[75] Inventor: Jeffry R. Meyer, Wilkins Township, Pa.

[73] Assignee: Westinghouse Electric Corporation, Pittsburgh, Pa.

[22] Filed: Jan. 12, 1976

[21] Appl. No.: 648,443

[52] U.S. Cl. ................................ 285/27; 156/158; 156/304; 285/55; 285/294; 285/423; 174/21 C
[51] Int. Cl.² ........................................ F16L 13/10
[58] Field of Search .... 285/294, 297, 423, DIG. 16, 285/47, 236, 369, 55, 27, 21, 22; 156/158, 304, 503; 174/21 C, 21 R, 84 R

[56] References Cited
UNITED STATES PATENTS

| | | | |
|---|---|---|---|
| 340,046 | 4/1886 | Hurlbut | 285/297 X |
| 494,147 | 3/1893 | Lloyd | 285/294 |
| 2,206,405 | 7/1940 | King | 285/294 |
| 2,313,074 | 3/1943 | Jewell | 285/294 |
| 2,498,831 | 2/1950 | Veitch | 285/DIG. 16 |
| 2,530,700 | 11/1950 | Jewell et al. | 285/294 |
| 3,043,055 | 7/1962 | Davey | 285/294 X |
| 3,843,170 | 10/1974 | Bagnulo | 285/294 X |

*Primary Examiner*—Thomas F. Callaghan
*Attorney, Agent, or Firm*—W. A. Elchik

[57] ABSTRACT

A pipe coupler utilized for connecting two sections of pipe to prevent the escape of gas from within the pipe through the joint therebetween. An annular coupling member comprises two end sections and an intermediate section therebetween, with the two end sections having an inside diameter substantially the same as the outside diameter of the pipe sections, while the inside diameter of the intermediate section is greater. The two pipe sections are disposed within the coupling member, with the joint positioned longitudinally within the intermediate section. The two pipe sections and the intermediate section form an annular space therebetween, and in this annular space is positioned an annular sealing gasket. The sealing gasket has an inside diameter substantially the same as the pipe outside diameter, and has a radially outwardly extension positioned therearound. The intermediate section has a pair of spaced apart openings, and filling plugs are sealingly disposed within these openings, and the plugs extend inwardly into the annular space. The gasket outwardly extension is positioned between the filling plugs. An adhesive sealant is disposed within, and substantially fills the annular space between the gasket and the coupling member. The adhesive sealant, which enters the annular space through the filling plugs, compresses the gasket against the two pipe sections to seal the pipe joint therebetween. Also included are means for preventing the sealant from leaking out of the annular space through the filling plugs.

7 Claims, 2 Drawing Figures

PIPE COUPLER

BACKGROUND OF THE INVENTION

This invention relates generally to gas containing piping, and more particularly to a pipe coupler for sealingly connecting two sections of piping in which is disposed a gas.

Gas containing piping has been in use for many years, most notably in the transmission of such gas from one location to another. A new use of gas containing piping has, however, recently emerged. The new use of such piping is for the transmission and distribution of electrical power. Electrical utilities and manufactures are investigating the use of compressed gas insulated transmission lines for the transmission and distribution of high voltage electricity.

A compressed gas insulated transmission line typically comprises a bare electrical conductor disposed within, but electrically isolated from, a grounded pipe. An insulating gas, typically sulfur hexafluoride, is disposed within the pipe and provides electrical insulation around the centrally disposed conductor. The compressed gas insulated transmission line has many advantages; superior reliability, lower maintenance cost, greater personnel safety, and a quieter, more environmentally acceptable operation.

To provide for a transmission line, a plurality of individual pipe sections, and their corresponding conductors, are coupled together. This coupling has generally been accomplished by means of welding, thereby maintaining the pipe sealed against the escape of the compressed sulfur hexafluoride gas. Recent developments, however, may preclude the use of welds to join adjacent sections together. One such recent development is the potential feasibility of a composite, or synthetic, pipe. Instead of utilizing a solid metal pipe as the enclosure around the electrical conductor, it is possible to use fabricated, synthetic pipes. This pipe typically comprises a cylindrical core of material such as wood or pressed board, with layers of, for example, aluminum foil disposed around the inside and outside of the pipes. This synthetic pipe has distinctive advantages, such as lower cost, less weight, and superior thermal properties.

A problem has arisen, though, in the use of such synthetic pipe for transmission lines. Some means must be found to sealingly couple two sections of pipe together to form the transmission lines. The prior art method of welding cannot be utilized because of the non-weldable material. Therefore, some new means of joining such pipe sections must be found before the use of such synthetic pipe will become practical.

SUMMARY OF THE INVENTION

The aforementioned need in the prior art is fulfilled by this invention by providing a coupler for sealingly connecting two sections of synthetic pipe having a gas disposed therein. The coupler comprises an annular elongated coupling member having two end sections and an intermediate section therebetween. The two end sections have inside diameters substantially equal to the outside diameter of the pipe, while the intermediate section has an inside diameter slightly greater than the outside diameter of the pipe. The intermediate section and the pipe form an annular space therebetween, and an elongated annular sealing gasket is positioned within this annular space adjacent the joint between the two pipe sections to be connected. The intermediate section has a plurality of pairs of opening therein with filling plugs sealingly disposed therethrough, and the filling plugs extend inwardly into the annular space. An adhesive sealant is disposed within the annular space, having entered through the filling plugs, and the sealant compresses the gasket against the pipe sections to prevent the sealant from entering the interior of the pipe. The sealant fills the space between the coupling member and the pipes, sealing the joint and providing mechanical support. To prevent longitudinal movement of the gasket, the gasket has a radially outward extension which is positioned intermediate the two filling plugs, which inhibits such longitudinal movement. Also included are means for preventing the sealant from leaving the annular space through the filling plugs.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
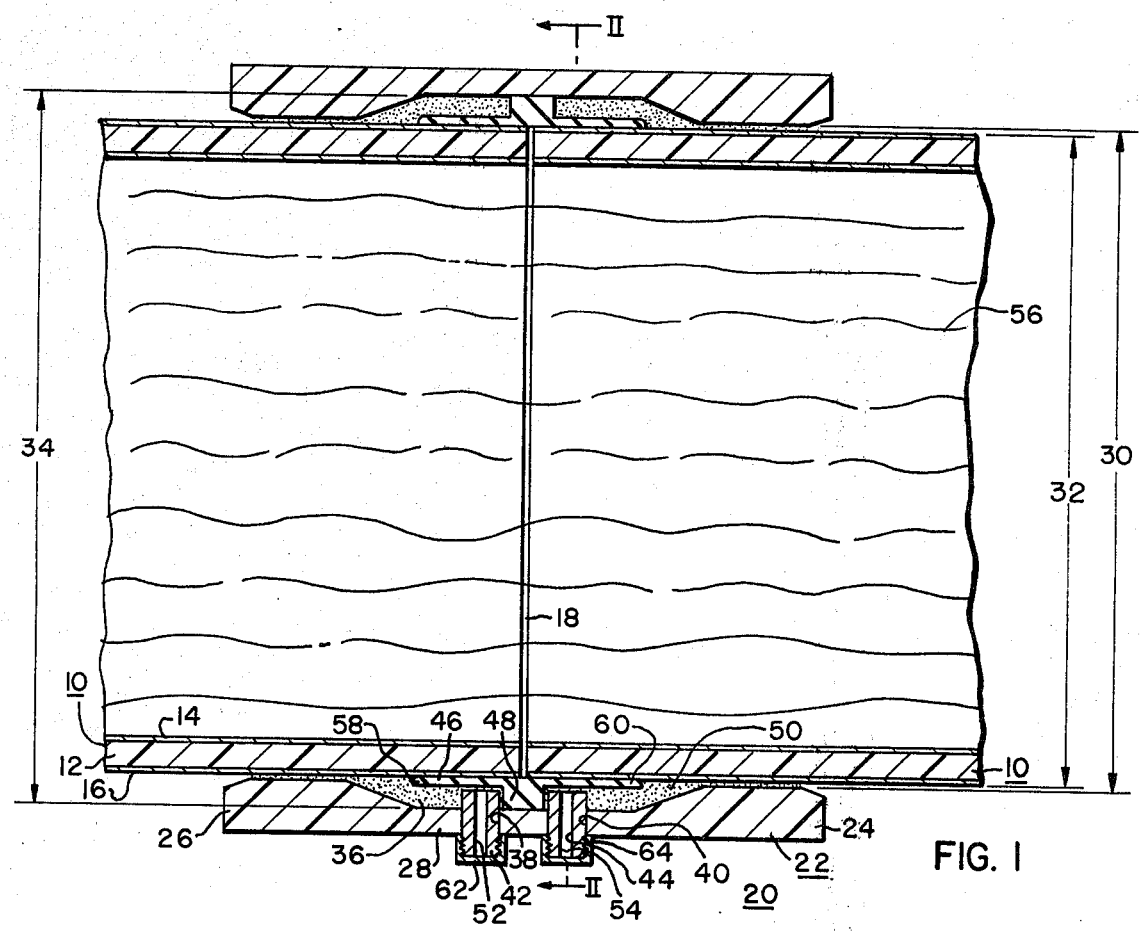
FIG. 1 is an elevational view of the coupler of this invention.

FIG. 1 is an elevational view showing the coupler used to sealingly join the two sections of pipe. The pipe 10 is a synthetic pipe which is comprised of an annular core 12 of a material such as wood or pressed board, and secured to the inside and outside of the core 12 are layers 14, 16 of an electrical conducting material such as aluminum foil. The two pipe sections 10 are desired to be joined together to form a continuous line. The two pipe sections 10 form a joint 18 therebetween, and this joint 18 must be sealed to prohibit the insulating gas 56 disposed within the pipe 10 from leaking out of the pipe 10.

The coupler 10 utilized to sealingly connect the two sections of pipe 10 comprises an annular, elongated coupling member 22 which may be of the same material as the pipe 10, and the coupling member 22 is comprised of three sections: two end sections 24, 26, and an intermediate section 28 between the two end sections 24, 26. The two end sections 24, 26 have an inside diameter 30 which is substantially equal to the outside diameter 32 of the pipe 10 to be connected. The intermediate section 28 has an inside diameter 34 which is greater than the outside diameter 32 of the pipe 10. The intermediate section 28 and the pipe 10 form an annular space 36 therebetween.

The intermediate section 28 has a pair of longitudinally spaced apart openings 38, 40 therethrough, and sealingly disposed in the openings 38, 40 are a pair of filling plugs 42, 44, respectively. The filling plugs 42, 44 extend inwardly into the annular space 36 and preferably extend outwardly beyond the outside of the intermediate section 28.

Disposed within the annular space 36, adjacent to the two pipe sections 10 and longitudinally opposite the joint 18 is an annular, elongated sealing gasket 46. The sealing gasket 46 has an inside diameter substantially equal to the outside diameter 32 of the pipe sections. To inhibit longitudinal movement of the gasket 46, the gasket 46 has a radially outwardly extension 48 and this extension 48 is positioned between the inwardly extending filling plugs 42, 44. Thus, the filling plugs 42, 44 hold the extension 48 therebetween, and this inhibits longitudinal movement of the gasket 46.

Disposed within the annular space 36 is an adhesive sealant 50. The adhesive sealant 50 enters the annular space 36 through openings 52, 54 in the filling plugs 42, 44, respectively. The sealant is a highly viscous, flexible, homogeneous, non-hardening polymerized compound containing inert mineral fillers. Such compounds are available commercially, and may be purchased under the trademarks of, for example, Tightseal, Duxseal, and Silastic. The adhesive sealant 50 operates to compress the gasket 46 against the two pipe sections 10, thereby preventing the sealant 50 from entering the interior of the pipe 10. The sealant 50 will eventually fill the annular space 36 between the pipes 10 and the coupling member 22 and seal the joint 18, thereby preventing the insulating gas 56 disposed within the pipe 10 from leaking out through the joint 18.

The coupler operates as follows. The two pipe sections 10 are inserted into the coupler 20, and are disposed within the gasket 46. Preferably, the longitudinal location of the joint 18 should be opposite the location of the outwardly extension 48 on the gasket 46. To facilitate the insertion of the pipe sections 10 into the gasket 46, the longitudinal ends 58, 60 of the gasket should be tapered radially outwardly, to thereby guide the pipe sections 10 into the gasket 46. Once the pipe sections 10 are within the gasket 46, the adhesive sealant 50 is inserted into the annular space 36 through the openings 52, 54 in the filling plugs 42, 44, respectively by pumping means (not shown), and the sealant 50 is inserted until it substantially fills the annular space 36 between the gasket 46 and the intermediate section 28. The sealant is continuously pumped into the annular space 36 until it begins to run out of the two end sections 24, 26. When this occurs, the sealant 50 has substantially filled the annular space 36, and is exerting a compressive force against the gasket 46, which is then sealing the joint 18 between the two pipe sections 10. Once the filling of the annular space 36 with the sealant 50 is completed, the filling plugs 42, 44 are sealed by caps 62, 64 to prevent the adhesive sealant 50 from leaving the annular space 36. The highly viscous nature of the sealant 50 prevents it from leaving the annular space 36 through the two end sections 24, 26 once the pumping action has ceased. Thus, the two pipe sections 10 are now sealingly joined and the insulating gas 56 disposed therein will not be able to leak out at the joint 18 between the two pipe sections 10.

Figure 2:
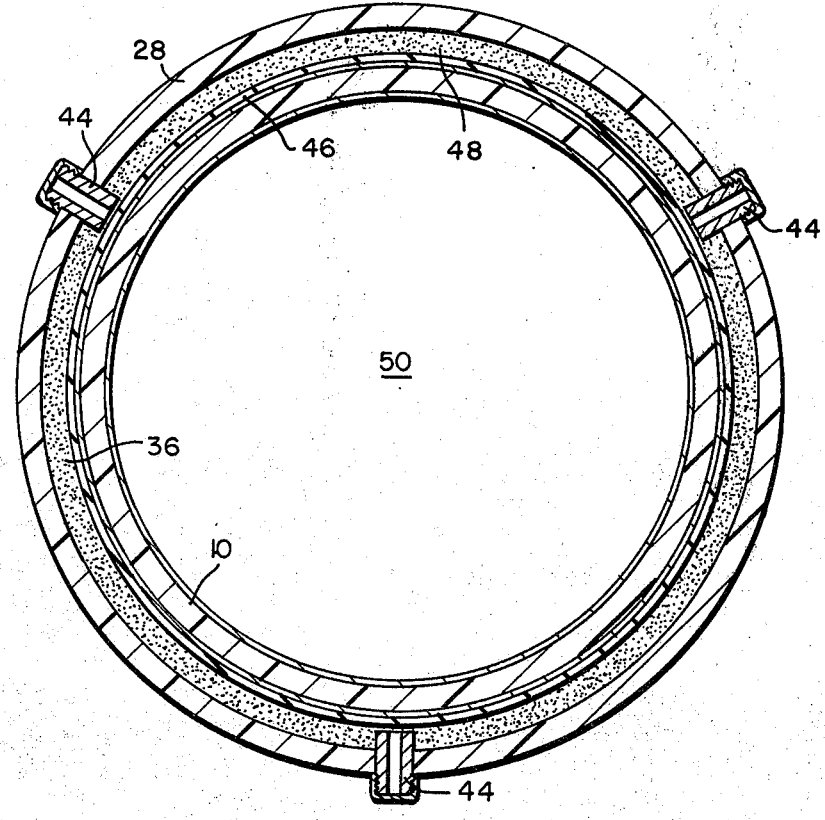
FIG. 2 is a sectional view taken along line II—II of FIG. 1.

Referring now more particularly to FIG. 2, it is seen that there are a plurality of pairs of filling plugs 42, 44. The filling plugs 42, 44 are radially spaced equidistantly apart around the intermediate section 28 of the coupler 20. As shown, filling plugs 44 are located 120° apart. The use of a plurality of pairs of filling plugs 42, 44 is to insure that the adhesive sealant 50 completely fills the annular space 36, and exerts a uniform compressive force against the gasket 46.

Although this invention has been described with reference to a compressed gas insulated transmission line, it is to be understood that this invention is not to be so limited, and is applicable to any gas-containing pipe. Also, the coupler of the invention may be utilized with any type of pipe, wherever it is desirable to sealingly connect two sections of piping together to prevent the escape of a gas disposed within the pipe.

I claim as my invention:

1. A coupler for sealingly connecting two sections of pipe having a gas disposed therein, said pipe sections having the same outside diameter, said coupler comprising:

an annular, elongated coupling member comprising two end sections and an intermediate section therebetween, said end sections having an inside diameter substantially the same as said pipe outside diameter, said intermediate section having an inside diameter greater than said pipe outside diameter, said pipe sections being disposed within said coupling member and forming a joint between said pipe sections, said joint being longitudinally positioned along said coupling member within said intermediate section, said intermediate section and said pipe sections forming an annular space therebetween, said intermediate section having a pair of longitudinally spaced apart openings therein;

a pair of filling plugs sealingly disposed within said intermediate section openings and extending inwardly into said annular space;

an annular, elongated sealing gasket having an inside diameter substantially the same as said pipe outside diameter disposed within said annular space adjacent said pipe joint, said gasket having a radially outwardly extension positioned intermediate said filling plugs within said annular space, said filling plugs inhibiting longitudinal movement of said gasket through said gasket extension;

an adhesive sealant disposed within and substantially filling said annular space between said gasket and said coupling member, said sealant entering said annular space through said filling plugs, said sealant compressing said gasket against said pipe sections; and means for preventing said sealant from leaving said annular space through said filling plugs.

2. The coupler according to claim 1 wherein said intermediate section has a plurality of pairs of openings therein radially spaced equidistantly apart; and each of said intermediate section openings has a filling plug sealingly disposed therein.

3. The coupler according to claim 1 wherein said coupling member is made of the same material as said pipe sections.

4. The coupler according to claim 1 wherein each longitudinal end of said gasket is tapered radially outwardly to facilitate insertion of said pipe sections within said gasket.

5. The coupler according to claim 1 wherein said pipe joint is longitudinally positioned opposite said gasket outward extension.

6. The coupler according to claim 1 wherein said adhesive sealant comprises a flexible, homogeneous, non-hardening, polymerized, viscous compound.

7. The coupler according to claim 1 wherein said filling plugs extend radially outwardly beyond said coupling member; and said sealant leaving prevention means comprise a cap sealingly secured to each filling plug.

* * * * *